Aug. 22, 1961  W. S. THOMPSON  2,997,003
TROLLEY MECHANISM
Filed Feb. 26, 1960
FIG.1
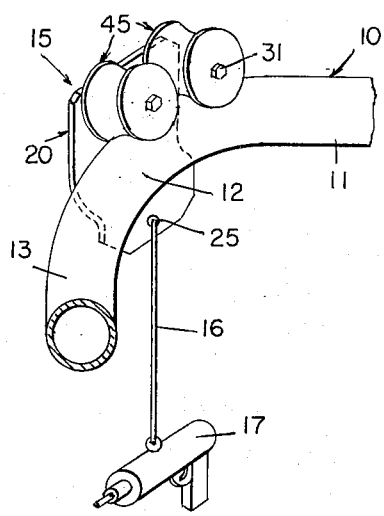
FIG.3
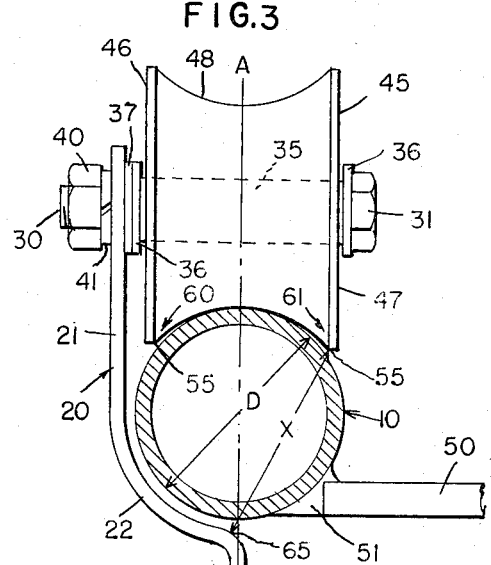
FIG.2
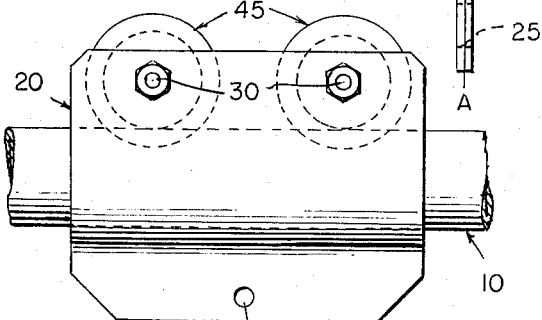
FIG.4
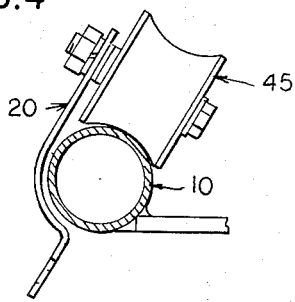
FIG.5
INVENTOR
William S. Thompson
BY *Shoemaker and Mattare*
ATTORNEYS United States Patent Office 2,997,003
Patented Aug. 22, 1961

2,997,003
TROLLEY MECHANISM
William S. Thompson, Watkins Glen, N.Y., assignor to Shepard Niles Crane & Hoist Corporation, Montour Falls, N.Y., a corporation of New York
Filed Feb. 26, 1960, Ser. No. 11,177
2 Claims. (Cl. 104—93)

The present invention relates to a new and novel trolley mechanism, and more particularly to a trolley mechanism which is adapted to permit free swinging of the trolley with respect to the track and which prevents the trolley from becoming unhooked from the track during operation.

Trolley mechanisms according to the present invention are generally employed in manufacturing plants or the like where it is desired to support small tools, flexible conductors or control pendants and the like in such a manner that the supported members can be easily moved from place to place as desired. These types of mechanisms generally employ some sort of supporting track which is fixed in a particular position, the trolley including rollers which permit the trolley mechanism to be rolled along the track while supporting the tool or the like thereby eliminating the necessity of lifting the tool when moving the tool from place to place.

Particularly when using tools which are supported from such trolleys, it is commonly desirable to be able to swing the tool from side to side thereby necessitating pivotal movement of the trolley around the supporting track. However, when such pivotal movement is permitted, it is also necessary to prevent the trolley from becoming unhooked from the track since it is apparent that it would be extremely hazardous if there were a possibility that the trolley could become unhooked and fall upon a person employing the supported tool.

In addition, the trolley must be relatively stable on the track such that it will easily run along the track and will not become wedged or jammed with respect to the track.

In order to accomplish the desired results above referred to, the present invention employs a supporting track having an arcuate support surface which more readily permits pivotal movement of the trolley with respect to the track. The trolley itself includes a pair of rollers having concave surfaces which fit on the arcuate supporting surface of the track and cooperate therewith to permit ready swinging movement of the trolley with respect to the track, and, of course, also support the trolley for rolling movement along the track.

The body means of the trolley includes a supporting plate having an intermediate portion which has an arcuate curvature substantially complementary to the outer surface of the track and spaced therefrom. With this construction, the support plate does not interfere with swinging movement of the trolley. In addition, the intermediate arcuate portion of the plate is spaced from the lowermost portions of the outer portions of the bearing surfaces of the rollers supported by the plate a distance which is less than the least lateral dimension of the supporting track. In this manner, the trolley is prevented from becoming unhooked from the track during operation of the mechanism which, of course, is an essential feature and a primary object of the present invention.

The trolley is also provided with a pair of spaced rollers which give the trolley stability on the track and prevent wedging or jamming of the trolley such that the trolley runs freely along the track.

In addition, the two rollers are spaced a relatively short distance from one another such that the trolley may be said to have a relatively short wheel base which permits the trolley to readily traverse a track having a small radius of curvature at points where the track turns from one direction to another.

An object of the present invention is to provide a new and novel trolley mechanism including a trolley which is freely movable along a supporting track for movably supporting small tools and the like therefrom.

Another object of the invention is to provide a trolley mechanism including a trolley which is adapted to swing laterally from side to side of the track during operation to permit maximum flexibility when in use.

A further object of the invention is the provision of a trolley mechanism wherein the trolley is so constructed and dimensioned with respect to the supporting track that the trolley is prevented from becoming unhooked in a lateral direction with respect to the track.

A still further object of the invention is to provide a trolley mechanism wherein the trolley is so mounted on the supporting track that it is quite stable and will not wedge or jam on the track whereby the trolley is free running and is further adapted to traverse a track having a small radius at a bend in the track.

Other objects and many attendant advantages of the present invention will become apparent when considered in connection with the specification and accompanying drawing wherein:

FIG. 1 is a perspective view illustrating the manner in which a tool is supported from the trolley mechanism in use;

FIG. 2 is a side elevation illustrating the trolley in supported position on a track;

FIG. 3 is an end view of the trolley mechanism shown in FIG. 2 with the supporting track shown in section;

FIG. 4 illustrates the trolley wherein the rollers have been swung to the right with respect to the track; and FIG. 5 illustrates the trolley wherein the rollers have been swung to the left with respect to the track.

Referring now to the drawings wherein like reference characters designate corresponding parts throughout the several views, FIG. 1 illustrates a supporting track 10 which, as shown, includes a straight portion 11 and a curved portion 12 whereby the track changes directions through an angle of substantially 90 degrees such that the end portion 13 extends substantially normally to the portion 11. The trolley indicated generally by reference numeral 15 is shown as traversing the bend in the supporting track.

As shown in FIG. 1, a depending line or chain 16 is secured to the lower portion of the trolley and a tool 17 is shown as supported at the lower end of the line 16. As illustrated, tool 17 is shown as comprising a drill. It is apparent that many different types of items may be supported from the trolley such as small tools, flexible conductors, or control pendants and the like as previously noted. It is further evident that as shown in FIG. 1 when it is desired to move the drill 17 from place to place, it is merely necessary to pull the trolley through the intermediary of line 16 to cause it to roll along track 10.

Referring now to FIGS. 2–5, the trolley includes a body means comprising a flattened plate 20 which is substantially rectangular in elevation as seen in FIG. 2 with the end corners thereof cut off at an angle. The body means as seen most clearly in FIG. 2 for example includes an upper portion designated by reference numeral 21, an intermediate portion designated by reference numeral 22 and a lowermost portion designated by reference numeral 23. An opening 25 is provided through lower portion 23 for securing the depending line or chain to the plate 20.

The upper portion 21 of the plate 20 is provided with a pair of spaced openings which snugly receive a pair of studs 30, the studs having a head 31 formed at one end thereof and the opposite end portions of the studs being threaded. A bearing means is mounted on the stud and includes a cylindrical portion 35 having flanges 36 formed at the opposite ends thereof, the bearing means being clamped between the head 31 of the stud and a washer 37 mounted on the stud. A nut 40 is threaded on the outer threaded end portion of the stud and bears against a lock washer 41 for locking each of the support assemblies for the rollers in operative position extending laterally of the upper end portion of the plate.

Mounted on each of the bearing assemblies is a hardened steel roller, each of which is indicated generally by the reference numeral 45. Each of these rollers includes opposite end portions 46 and 47, and a concave bearing surface 48 extends between the opposite end portions of the roller, the concavity of bearing surface 48 being particularly dimensioned as hereinafter described.

The track upon which the rollers of the trolley are normally supported is substantially circular in cross section as seen most clearly in FIGS. 3–5 and for the purpose of economy is formed as a cylindrical member having an outer diameter D. Support brackets 50 may be secured to any suitable supporting means such as a wall or the like and extend laterally thereof, the outer end portions of brackets 50 being welded as indicated at 51 to a lower lateral portion of the track 10. The support brackets 50 may be secured to the track at suitably spaced points therealong in order to provide an adequate support for the track, and the location of the attachment of the brackets to the track is such that it permits a maximum swinging movement of the trolley with respect to the track without interfering with such swinging movement as will become apparent from the following description.

As seen in FIGS. 3–5, it will be noted that the radius of curvature of the concave bearing surface 48 of each of the rollers is slightly greater than the radius of curvature of the outer surface of the track 10 thereby providing small clearances indicated by reference numerals 55 between the inner portions and the outer portions of the bearing surfaces and the track, the inner portion of the bearing surface of each roller being that portion which is spaced most closely adjacent to plate 20 and indicated by reference numeral 60 while the outer portion of each bearing surface being that portion of the bearing surface which is remote from plate 20 and which is indicated by reference numeral 61. With this construction, the rollers are supported for rolling movement along the track, and at the same time, the rollers can freely move in a lateral direction to permit swinging movement of the trolley with respect to the track.

The intermediate portion 22 of the plate 20 is provided with an arcuate configuration which as seen in FIGS. 3–5 is such that the intermediate portion 22 is spaced during operation of the apparatus from the adjacent arcuate portions of the track, and is positioned substantially a constant distance from the outer surface of the track throughout the width of the arcuate intermediate portion. In other words, the inner surface of the intermediate portion 22 substantially defines a portion of a cylindrical surface.

At the lowermost portion of the intermediate portion 22 as indicated by reference numeral 65, the intermediate portion merges with and is integral with the downwardly extending lower portion 23. Lower portion 23 extends substantially radially outwardly of the rollers 45, and it will be noted that portion 23 lies in a plane A—A which is a plane extending radially of the rollers and which lies substantially medially between the opposite end portions of the rollers, the plane thereby substantially bisecting each of the two rollers which are aligned with one another in a direction longitudinally of the trolley.

It will be noted that the arcuate configuration of intermediate portion 22 permits this portion to be spaced closely adjacent to the track, and yet permits the trolley to swing to the right and to the left as seen in FIGS. 4 and 5 without in any manner interfering with such swinging movement of the trolley.

An important feature of the invention is the novel interrelationship of the components which prevents the trolley from becoming unhooked from the track during operation. As indicated in FIG. 3, a distance X is defined between the lowermost portion of the intermediate portion 22 of the plate and the lowermost portion of the outer portion of the bearing surface of each of the rollers 45. This distance X is less than the diameter D of the associated track such that it is impossible for the trolley to become unhooked from the track in a lateral direction during operation. It is, of course, evident that the trolley may be threaded onto the track in a longitudinal direction at one end of the track. It is obvious that if the distance X is less than the diameter D, the track can not pass through the space having the dimension X, and yet at the same time as seen in FIGS. 4 and 5, trolley can readily swing in both directions about the track through a relatively wide angle without there arising any possibility of the trolley's falling off of or becoming unhooked from the track. The pair of spaced rollers provides stability for the trolley and permits free running of the trolley along the supporting track. At the same time, the rollers are spaced a relatively small distance from one another whereby the trolley can traverse a bend of small radius in the track. Accordingly, there is no possibility of wedging or jamming the trolley on the track during operation.

It is apparent from the foregoing that there is provided a new and novel trolley mechanism wherein a trolley is freely movable along a supporting track for movably supporting small tools and the like. The trolley can freely swing from side to side of the track in a lateral direction to provide maximum flexibility of the mechanism during use, and at the same time the trolley is positively prevented from becoming unhooked in a most simple and expeditious manner.

The arrangement is such that the trolley is mounted in a stable manner on the supporting track, and furthermore, the trolley is adapted to traverse bends of small radius in the track.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. In combination, a supporting track having a substantially cylindrical outer surface, a trolley including a support plate, said support plate including an upper portion, an intermediate portion and a lower portion, at least one roller means freely rotatably supported by the upper portion of said plate, said roller having a concave bearing surface which is substantially complementary to the outer surface of the track and which is supported on the track, said bearing surface including an inner portion adjacent said plate and an outer portion remote from said plate, the intermediate portion of said plate being arcuate and spaced from the outer surface of said track to permit free swinging of the trolley in either lateral direction with respect to the track, the intermediate portion extending inwardly and terminating in said lower portion of the plate, said lower portion of the plate being substantially aligned with a plane extending radially of said roller and lying medially between the inner and outer portions of said bearing surface of the roller, the lowermost portion of said intermediate portion of the plate being spaced from the lowermost portion of the outer portion of said bearing surface a distance less than the diameter of said supporting track thereby preventing unhooking of the trolley from the track in a lateral direction.

2. A trolley mechanism including a supporting track and a trolley, said supporting track having a substantially cylindrical outer surface, said trolley including a support plate, said support plate including an upper portion, an intermediate portion and a lower portion, a plurality of support means extending laterally to one side of the upper portion of said plate, a roller freely rotatably supported on each of said support means, each of said rollers having a concave bearing surface having a slightly greater radius of curvature than the outer surface of said support track and being supported on said support track such that the rollers can freely roll on the track and permit free swinging motion of the trolley with respect to the track, said rollers being substantially aligned in a direction extending longitudinally of the track and the bearing surface of each roller including an inner portion adjacent said plate and an outer portion remote from said plate, said intermediate portion of said plate being arcuate and spaced from the adjacent arcuate portion of said support track, the lowermost portion of said intermediate portion terminating in said downwardly extending portion of the plate, the downwardly extending portion being directed away from said roller and being substantially in in a plane extending radially of said roller and spaced medially between the inner and outer portions of the bearing surfaces of said rollers, the lowermost portion of the intermediate portion of said plate being spaced from the lowermost portions of the outermost portions of said rollers a distance less than the diameter of the outer surface of the supporting track to prevent the trolley from becoming unhooked from the track in a lateral direction during operation of the mechanism.

References Cited in the file of this patent
UNITED STATES PATENTS

| | | |
|---|---|---|
| 368,633 | Warwick | Aug. 23, 1887 |
| 771,766 | Burkholder | Oct. 4, 1904 |
| 813,399 | Browne | Feb. 27, 1906 |
| 946,694 | Davis | Jan. 18, 1910 |
| 1,329,461 | Frantz | Feb. 3, 1920 |
| 2,232,222 | Flinn | Feb. 18, 1941 |